US006137760A

United States Patent [19]

Okamoto

[11] Patent Number: 6,137,760

[45] Date of Patent: Oct. 24, 2000

[54] INFORMATION RECORDING AND REPRODUCING APPARATUS

[75] Inventor: Akihiko Okamoto, Kawasaki, Japan

[73] Assignee: Ricoh Co., Ltd., Tokyo, Japan

[21] Appl. No.: 09/464,197

[22] Filed: Dec. 16, 1999

Related U.S. Application Data

[62] Division of application No. 08/863,071, May 23, 1997.

[30] Foreign Application Priority Data

May 24, 1996 [JP] Japan .................................... 8-151921
Feb. 7, 1997 [JP] Japan ...................................... 9-38637

[51] Int. Cl.[7] ...................................................... G11B 33/02
[52] U.S. Cl. ............................................................. 369/75.2
[58] Field of Search ................................. 369/77.1, 77.2, 369/75.1, 75.2; 360/99.02, 99.06, 99.07

[56] References Cited

FOREIGN PATENT DOCUMENTS

| | | |
|---|---|---|
| 61691 | 6/1991 | Japan . |
| 4-103391 | 9/1992 | Japan . |
| 4-115395 | 10/1992 | Japan . |
| 5-47909 | 7/1993 | Japan . |
| 5-73739 | 10/1993 | Japan . |
| WO 96/3966 | 11/1996 | Japan . |
| 9-55005 | 2/1997 | Japan . |
| 10-503316 | 3/1998 | Japan . |

*Primary Examiner*—David Davis
*Attorney, Agent, or Firm*—Dickstein Shapiro Morin & Oshinsky LLP

[57] ABSTRACT

A dust proof recording and reproducing apparatus has a movable tray for ejecting or loading a recording medium. The tray has a tray port through which it moves. A force element, such as a spring, forces an outer cover for the port towards an inner cover. The force element absorbs variations in the stopping position of the tray in a loaded condition so that the outer cover always contacts with and closes the outer circumferential area of the tray port.

9 Claims, 13 Drawing Sheets

INFORMATION RECORDING AND REPRODUCING APPARATUS

This is a division of application Ser. No. 08/863,071 filed May 23, 1997.

BACKGROUND OF THE INVENTION

1. Field of the Invention

The present invention relates to an information recording and reproducing apparatus which prevents dust from entering into the internal mechanism, even if the stopping position of a tray for loading a recording medium into the apparatus is variable.

2. Description of the Related Art

In an information recording and reproducing apparatus, a recording/reproducing disc is put on an eject tray, after which it is loaded into the apparatus for a recording/reproducing operation.

For example, Japanese Patent Publication (KOKOKU) No. 5-47909 discloses an information recording and reproducing apparatus as shown in FIG. 12. The apparatus has a tray port 104 provided at a front panel 102 of a housing 100, a tray 106 which is ejected from the tray port 104 and is loaded into the apparatus, a motor for ejecting and loading the tray 106 (not shown), and a sensor for detecting a position of the tray 106 (also not shown).

When the motor is driven and the tray 106 containing a disc is loaded into the apparatus and reaches a predetermined position, the sensor detects it, and the loading is completed and the loading motor is stopped. Then, the action of recording or reproducing starts.

However, in the information recording and reproducing apparatus having the above mentioned structure, a stopping position of the tray 106 is variable because of the variation of a detecting position of the sensor and an attaching position error of relational parts. Accordingly, a distance between a cover 108 and a tray port 104 is changed, which may provide a clearance for the entrance of dust.

Since the apparatus has a lens moving mechanism for moving a lens, if dust enters the interior of the apparatus, there is problem that the lens actuator may not work properly.

FIG. 13 is a partially enlarged view showing the relation of the position between the cover 108 and the tray port 104, when the tray 106 of FIG. 12 is loaded.

The tray port 104 has step structure with an upper portion 104*a* and a step portion 104*b*. As the tray 106 can move smoothly in loading the tray 106, an upper edge portion 108*a* of the tray 106 and the upper edge portion 104*a* of the tray portion 104 are provided to keep a distance L1 between them.

In such a case, if the stopping position of the tray 106 is variable because of the above reason, a clearance shown as L2 produced between a circumferential portion 108*b* of the tray 106 and the step portion 104*b* of the tray port 104, and dust enters the interior of the apparatus.

SUMMARY OF THE INVENTION

It is therefore an object of the present invention to provide an information recording and reproducing apparatus which does not have a clearance between a cover and a tray port, and thus prevents dust from entering the apparatus from the outside, even if there is a variation of a detecting position of the sensor or an attaching position error of relational parts.

These and other objects, advantages and features of invention will become more readily apparent from the following detailed description of the invention which is provided in conjunction with the accompanying drawings.

BRIEF DESCRIPTION OF THE DRAWINGS

FIG. 5(*b*) is a side view mainly showing the sleeve portion;

DESCRIPTION OF THE PREFERRED EMBODIMENTS

A first embodiment of the present invention will be next explained with reference to FIG. 1.

Figure 1:
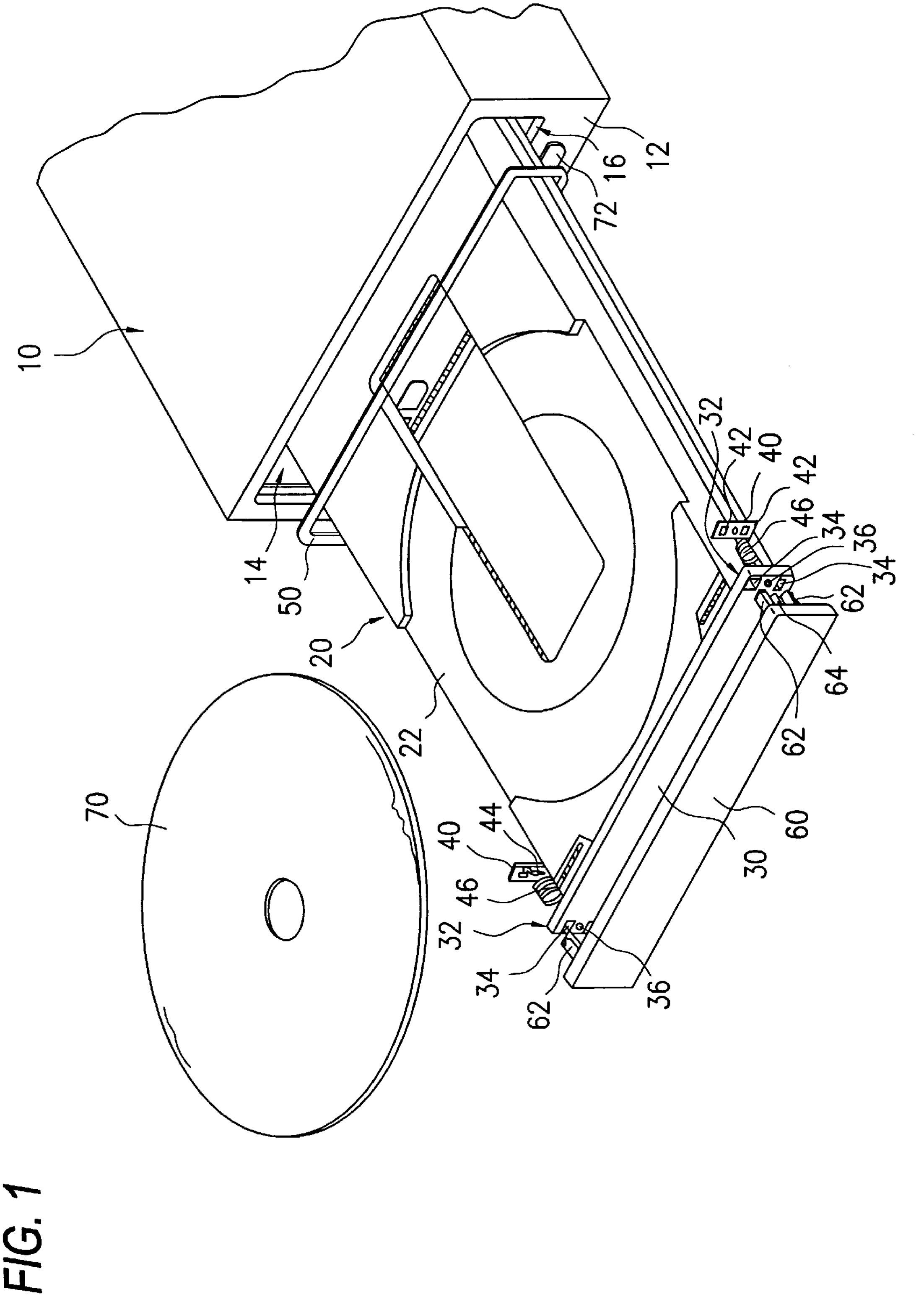
FIG. 1 is a exploded perspective view showing a first embodiment of an information recording and reproducing apparatus of the invention.

FIG. 1 is an exploded perspective view showing an information recording and reproducing apparatus in accordance with the present invention. The information recording and reproducing apparatus has a housing 10, and a tray 20 which can be ejected or loaded from a tray port 14 formed on a front panel 12 of the housing 10.

The tray 20 has a disc table 22 for receiving a disc 70 on a center portion of the table 27, an inner cover 32 provided for a front face in an eject direction, and an outer cover 60 which is connected with the inner cover 30 by latching a stopper 40.

On both side edge portions of the inner cover 32, latching insert holes 34 are provided at each of two side edge portions and a pin insert hole 36 is provided in the middle of the latching insert holes 34.

The outer cover has elastic latching portions 62 made of elastic material which are inserted into the resilient insert holes 34 of the inner cover. A pin 64 is also provided for cover 60 which determines a position of the outer cover 60 relative to the inner cover 30.

Figure 4:
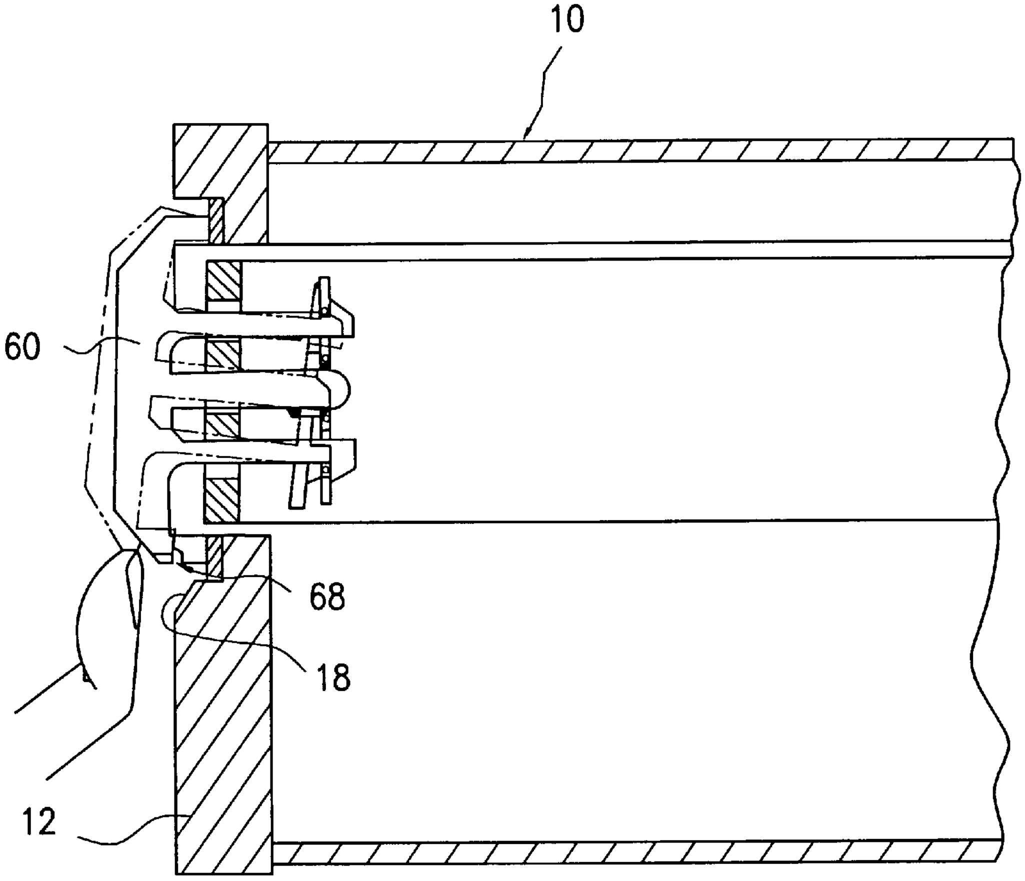
FIG. 4 is a view showing how the tray is taken out when there is an electric failure.

A resilient hook 68 is provided for an under edge portion of the outer cover 60, and a finger insert portion 18 is provided for the tray port 14 facing to the resilient hook 68 (FIG. 4).

In order to connect the outer cover 60 with the inner cover 30, a resilient latching portion 62 of the outer cover 60 and pin 64 are inserted into each of the resilient pin insert holes 36 of inner cover 30, such that the resilient latching portion 62 latches against the stopper member 40.

The latching is carried out by inserting the resilient latching portion 62 into the latching hole 42. As a hook portion **62*b* formed in taper is provided at the tip 62*a* of the resilient latching portion 62 (FIG. 1 or FIG. 2) when the resilient latching portion 62 is inserted into the latching hole 42, the resilient latching portion 62 is inserted with elastic transformation. In completion of the insert, the elastic transformation recovers and the resilient latching portion 62 latches with the stopper 40**.

Then, when the resilient latching portion 62 latches the stopper member 40, it cannot cancel the latching operation of the stopper member 40 unless it is transformed artificially.

And, the pin 64 is inserted and passed into the pin hole 44 provided for the stopper member 40 through a spring 46 which is a forcing member.

Other elastic members such as a rubber member or a sponge can be used in place of spring 46 as a forcing member.

When the resilient latching portion 62 latches the stopper member 40, the spring 46 is pressed and contracts by a predetermined quantity. The outer cover 60 is accordingly forced in a direction of the inner cover 30 by the force of spring 46.

In the tray 14 of the housing 10, a circumferential portion is formed as a step and an annular sealing member 50 is fixed on the step.

In accordance with the above structure, if a disc 70 is set on the disc table 22 and a load/eject switch 72 is pressed, the loading of the tray starts by a moving motor (not shown in the drawings).

The outer cover 60 is inserted into the tray port 14, the inner circumference 66 of it contacts the sealing member 50 and closes the tray port 14.

The power of the spring 46 is set a little smaller than the loading power of the tray 20, so after the outer cover 60 contacts the sealing member 50, only the tray 20 and the inner cover 30 are loaded. As noted, the relative distance between the outer cover 60 and the inner cover 30 is variable. However, since the variation of the relative distance is absorbed by construction of the spring 46, the position of the tray 20 can be detected by a sensor to stop tray loading.

Figure 2A:
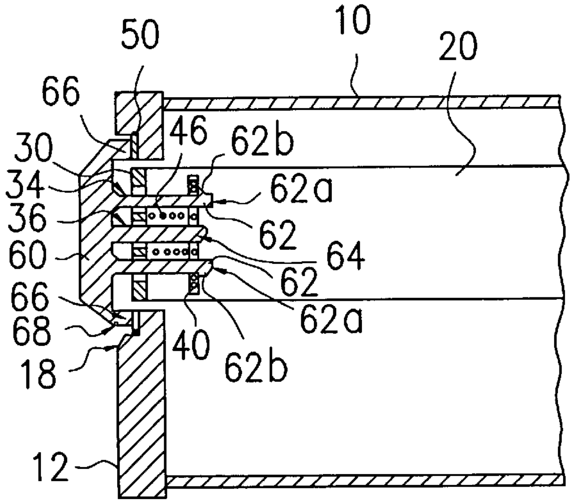
FIGS. 2(*a*), 2(*b*) and 2(*c*) are explanatory views showing the contacting relation between an outer cover and a sealing member when there is a variation in a stop position of a tray, where FIG. 2(*a*) shows the situation where the tray stops past a predetermined position, FIG. 2(*b*) shows the situation where the tray stops at the predetermined position, and FIG. 2(*c*) shows the situation where the tray stops before the predetermined position.
Figure 2B:
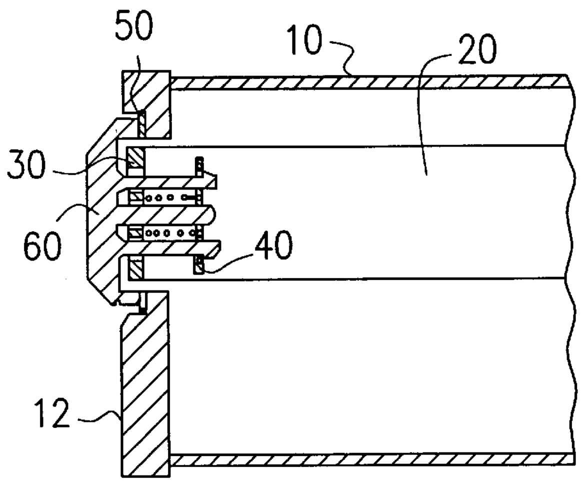
Figure 2C:
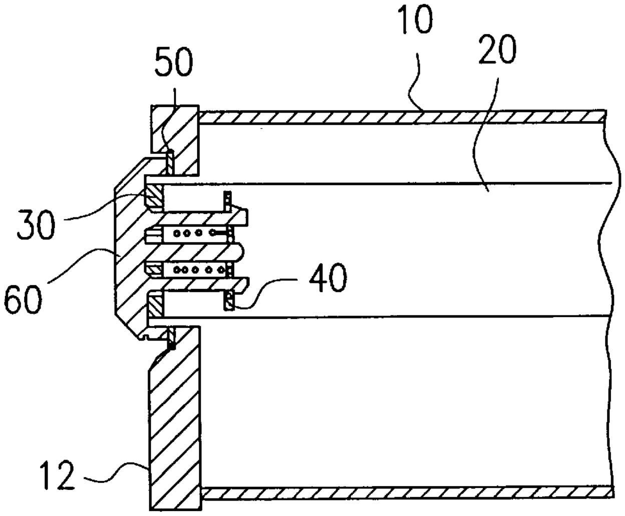

FIG. 2 shows a stopped condition of the tray 20. FIG. 2(*b*) shows a condition where the tray 20 stops at the predetermined position and the spring 46 contracts. FIG. 2(*a*) shows a condition where the tray stops after moving past the predetermined position. FIG. 2(*c*) shows a condition where the tray 20 stops before reaching the predetermined position, and the spring 46 does not reach the predetermined contraction.

Thus, the stop position of the tray may be variable due to a variation of sensor detecting position or due to a positioning error caused by the attachment of relative parts. However, in each condition shown in FIGS. 2(*a*), (*b*) and (*c*), the variation of the stop position is absorbed by a variation in the spring constriction, and the outer cover 60 and the sealing member 50 are contacted. In other words, even if the stop position of the tray 20 is not fixed, the outer cover and the sealing member 50 are usually contacted.

It is possible that while the information recording and reproducing apparatus is recording or reproducing, electric power may be stopped by electric failure and the disc 70 may be retained inside the apparatus. If this happens, the disc 70 can be taken out by holding the outer cover 60 of the tray 20 and taking it out. Since the outer cover is inserted into tray port 14, a holding portion is small, but a large power is necessary for removing it.

However, with the present embodiment as the outer cover 60 latches the inner cover 30 while being forced by the spring 46, the outer cover 60 can incline and move in an up and down direction against the inner cover 30 fully.

Then, the outer cover 60 can be taken out by inserting a finger into the finger insert portion 18 and hooking the resilient latching portion. The outer cover can easily incline, as shown in FIG. 4, and the tray 20 can be taken out easily.

As explained above, even if there is an attaching position error of the relative parts, or a variation of the tray position detected by the sensor, the outer cover and the sealing member can be usually contacted, and the tray port kept closed, thus preventing dust from entering the apparatus from the outside.

Figure 3A:
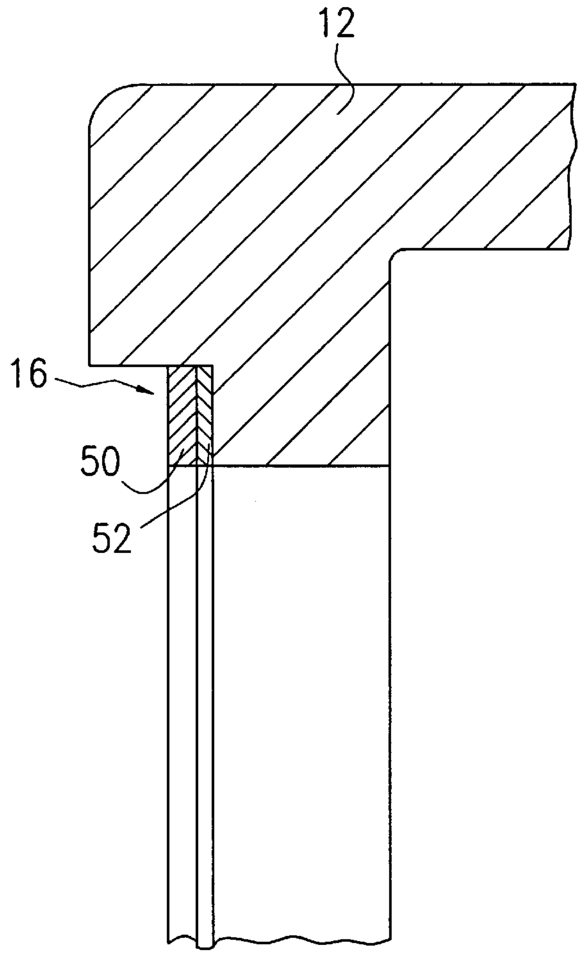
FIGS. 3(*a*) and 3(*b*) are views showing an attaching position of a sealing member where FIG. 3(*a*) shows the sealing member being attached to a step portion and FIG. 3(*b*) shows the sealing member being attached to a cover.
Figure 3B:
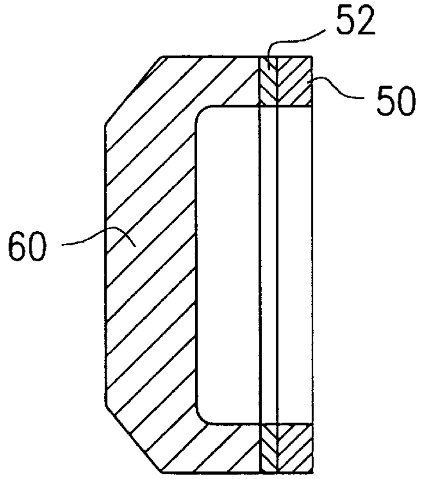

Although FIGS. 1, 2(*a*) and 2(*c*) explain the attachment of the sealing member 50 to the step portion 16, sealing member 50 may be attached to the outer cover 60 in the manner shown in FIG. 3(*b*).

The attachment of sealing member 50 can be, but is not limited to, an adhesive. A double-sided adhesive tape can be used instead of an adhesive. An adhesive material having a springing nature can also be used.

In some conditions of use (for example, where an airtight seal is not required), the sealing member 50 can be omitted. In this case, the outer cover 60 directly contacts with the step portion 16 to form a barrier.

The sealing member 50 may be made of rubber, sponge or other suitable materials. Chloropene, urethane rubber, silicone rubber and the like are suitable rubbers in view of their endurance and ability to provide a good seal. A sponge material comprising a foamed sponge of foamed polyurethane or the like is also suitable to produce an airtight seal.

In the information recording and reproducing apparatus having the above structure, the outer cover 60 is provided for the inner cover 30 in a manner which allows it to move and incline in an up and down direction fully.

However, while inclination and motion of the outer cover 60 is produced in order to prevent dust from entering the information recording and reproducing apparatus, a user cannot predict the inclination and motion from basic action of the information recording and reproducing apparatus, and it is possible he might mistake such inclination or motion as an indication that the apparatus is out of order.

Figure 5A:
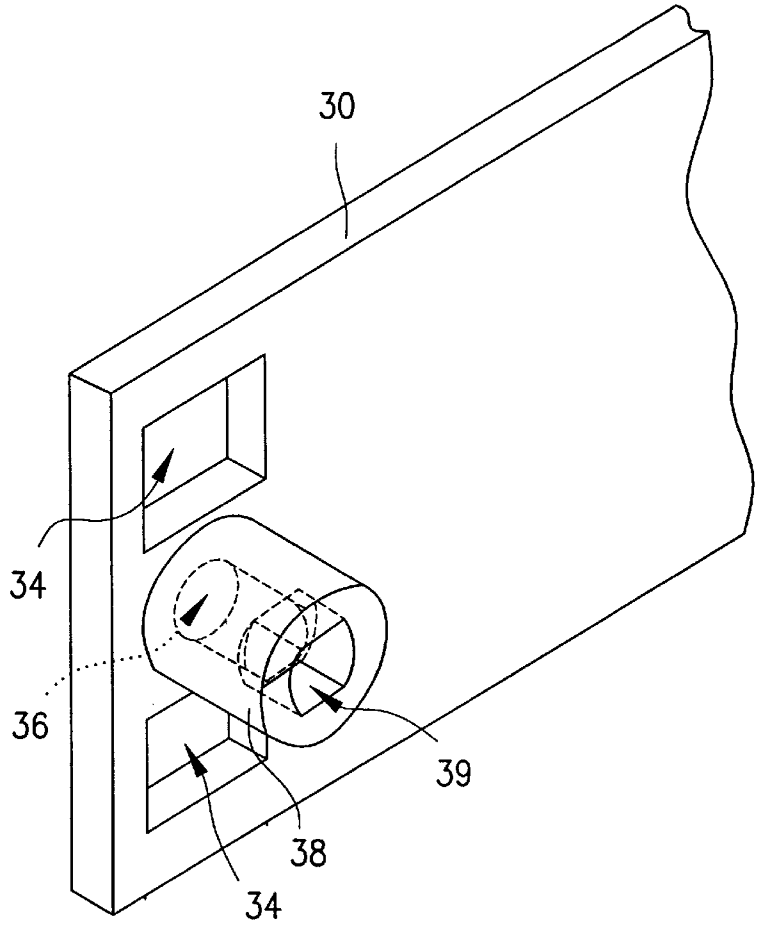
FIGS. 5(*a*) and 5(*b*) are views showing an inner cover provided with a sleeve; where FIG. 5(*a*) is a perspective view.
Figure 5B:
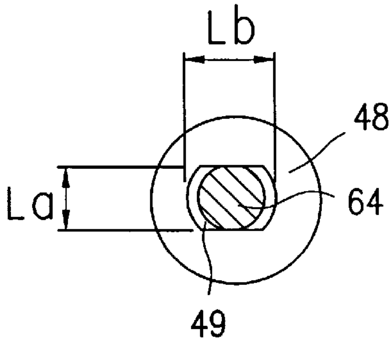

To alleviate this problem, the size of the pin 64 provided for the outer cover 60 has only to be equal to a size of the pin insert hole 30 provided for the inner cover 30. But, because, there is difference of thermal expansive quantity by common difference and difference of assembling circumstance temperature, if the hole and pin size are equal, it may be difficult to insert the pin 64 into the pin insert hole may occur. In such a case, it is preferred that a sleeve 38 (FIG. 5) is provided for the inner cover 30 which restrains the inclined quantity of the outer cover 60 in an up and down direction against the inner cover 30. The sleeve 38 is formed on the inner cover 30 in one body, or is fixed to it as shown in FIG. 5(*a*). In the interior, a hole 39 is provided to connect with the pin insert hole 36. One portion of this hole 39 is at least formed in sectional view in the form of an ellipse which has a size La in an up and down direction, and a size Lb in a left and right direction. The size La in an up and down direction of the ellipse is equal to the size of the pin 64. The size Lp in a left and right direction is greater than size of the pin 64.

Accordingly, upon inserting the pin 64, as an upper edge and under edge of the ellipse contacts the pin 64 and corrects the up and down motion, it is possible to correct inclination and motion in an up and down direction of the outer cover 60. FIG. 5(*a*) shows a side view of inserting the pin 64 into the sleeve 38.

Still, in inserting the pin 64 into the ellipse hole 39, as a size La in up and down direction of the ellipse hole 39 is equal to a size of the pin 64, users have some misgiving about the difficulty of inserting pin 64, of common error, but as size Lb in left and right direction is suitably greater than a size of the pin 64, the pin 64 transforms elastically and escapes in left and right direction, and it is possible to easily insert pin 64.

Of course, as the sleeve 38 is provided for the purpose of restraining inclination and motion of the pin 64, it may take other forms such as a rib which contacts an upper edge and under edge of the pin 64.

Generally, the moving mechanism of a disc loading/unloading apparatus easily becomes the origin of an accident. The outer cover 60, which has a place where a user can touch it, may cancel the latching of the resilient latching portion 62 which latches the outer cover 60 and the stopper member 40. Thus, when the resilient latching portion is inserted into the latching hole, as the hook portion **62*b* provided at the tip of the resilient latching portion 62 is inserted with contacting the latching hole 41, the resilient latching potion 62 is inserted with a curve. Then, a size of the latching hole 42 needs to be greater than a size of the hook portion 62*b*. If the interval of the resilient latching portions which is provided for nipping the pin 64 and the interval of the latching holes 42 are formed to be same, as soon as the resilient latching portion transforms a little, it is off from the latching hole 42**.

To avoid this, the size of the hook portion **62*b* may be made large. However, in this case, it is necessary to make the interval of the resilient latching portions large, and secondarily, to make the outer cover 60** large. This increases the size and produces a large apparatus.

Figure 6A:
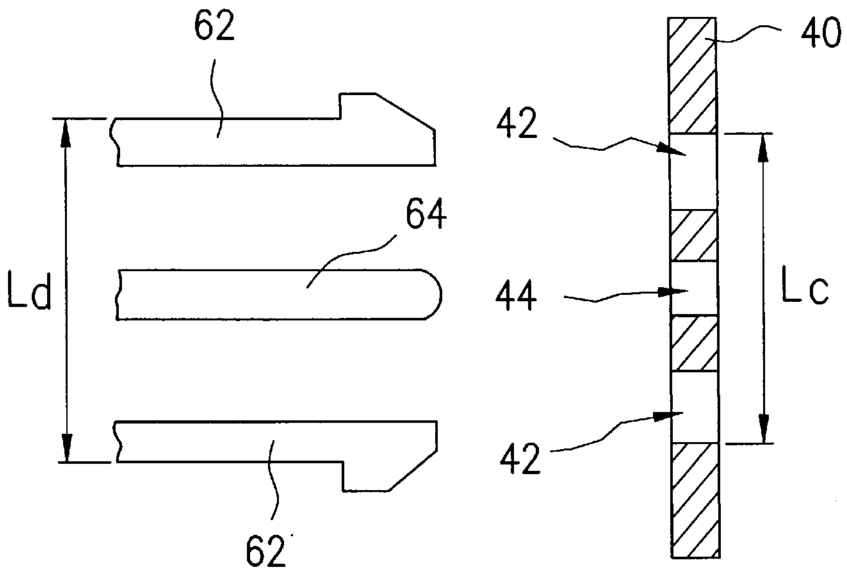
FIGS. 6(*a*) and 6(*b*) are explanatory views showing the difference between an interval of resilient latching portions and an interval of latching holes; where FIG. 6(*a*) shows the elements before inserting the resilient latching portion into a stopper member and FIG. 6(*b*) shows them after insertion.
Figure 6B:
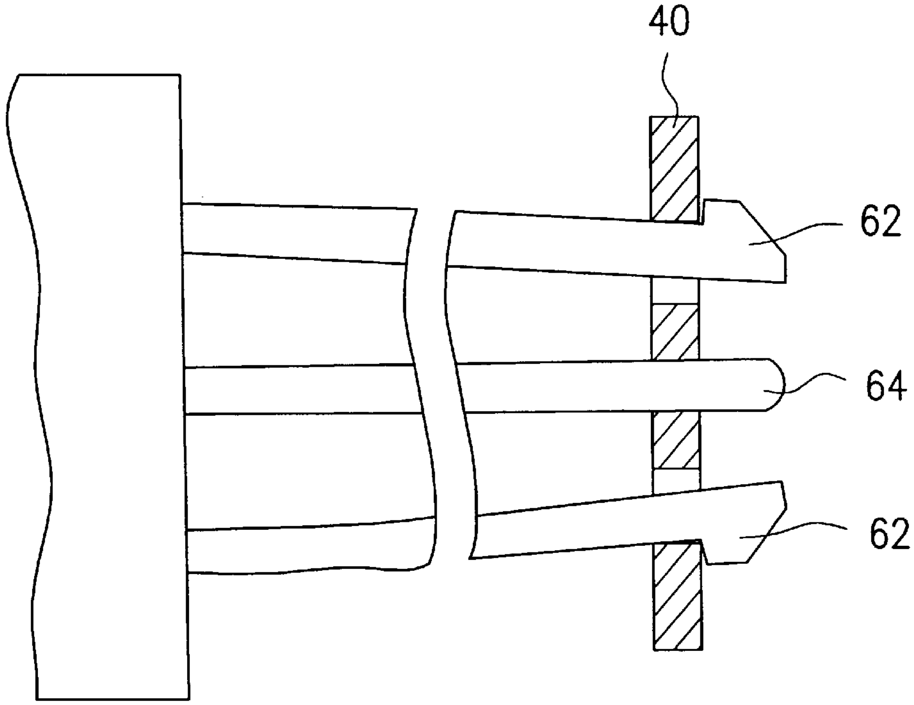

To avoid such a problem, as shown FIG. 6(*a*), it is preferred that the resilient latching portion cannot come off from the latching hole 42. This is accomplished by making interval Lc of the latching holes 42 smaller than interval Ld of the resilient latching portions 62, even when the latch portions 62 deform. With such structure, as the resilient latching portion 62 is inserted into and latches with the latching hole 42, it curves (FIG. **6*b*) in a direction toward the middle pin 64**, and, once latched, cannot be easily unlatched.

Moreover, if the pin 64 requires a force for insertion by making a size of the pin hole 4 smaller than a size of the pin 64, after the pin 64 is inserted it can be slightly fixed to the pin hole 44. Accordingly, even if latching between the resilient latching portion 62 and the latching holes 42 is loose, the latching cannot be canceled.

Figure 7A:
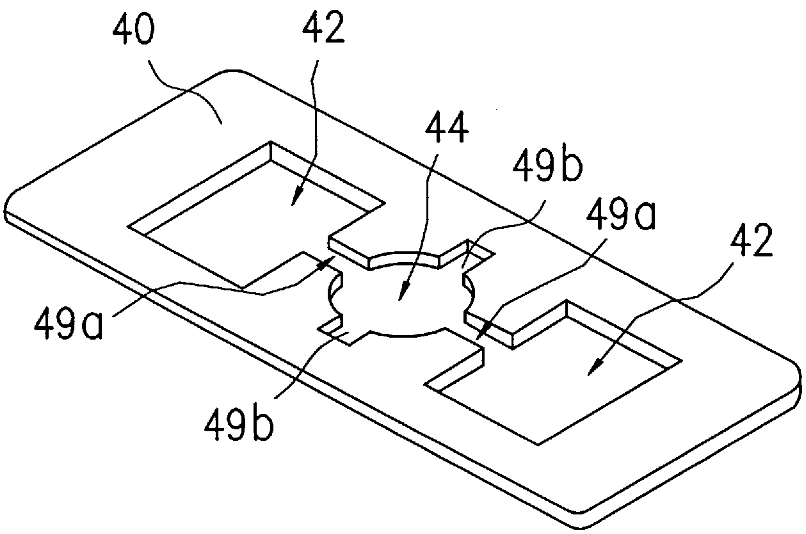
FIGS. 7(*a*) and 7(*b*) are views showing a stopper member having a strengthened latching between a pin and pin hole, where FIG. 7(*a*) shows a slit and notch portion and FIG. 7(*b*) shows a rising portion.
Figure 7B:
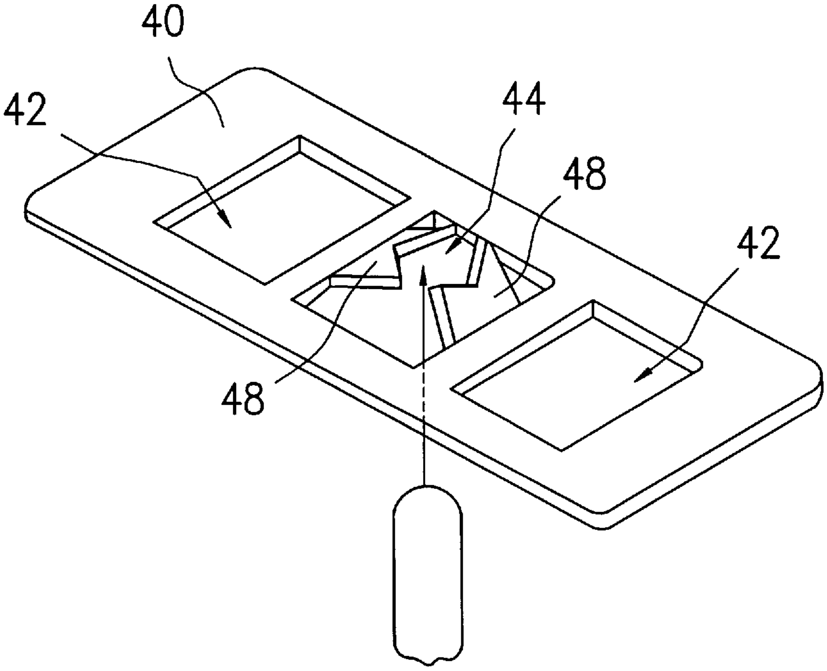

As another way to hold the pin, it is also possible to use the structure shown in FIGS. 7(*a*) and 7(*b*). FIG. 7(*a*) shows a slit **49*a* which is connected to the pin hole 44 provided for the stopper member 40 with the latching hole 42, and a notch provided for the slit 49*a* in vertical direction. Then, a size of the pin hole 44 can be set smaller than a size of an inserted pin 64. In such a structure, when pin 64 is inserted, a circumferential portion of the pin hole 44 transforms in an insertion direction. When pin 64 is completely inserted, the force generated by a circumferential portion of the pin hole 44 acts to prevent pin 64** from coming off.

FIG. 7(*b*) is a view showing another structure for heightening the action of preventing pin 64 from coming off. A rising portion 48 nipping the inserted pin 64 is provided for the circumferential portion of the pin hole 44. And a portion contacting the pin hole 44 is formed in curved rate smaller than the curved rate of pin 64. Accordingly, pin 64 is easily inserted into rising portion 48 which then generates a force and prevents pin 64 from coming off. If the portion contacting pin 64 is smaller than the curved rate of pin 64, pin 64 and the rising portion 48 contacts at one point, so that the removing force concentrates at the contacting point, and the rising portion 48 encroaches pin 64, making it difficult to remove pin 64.

Figure 8A:
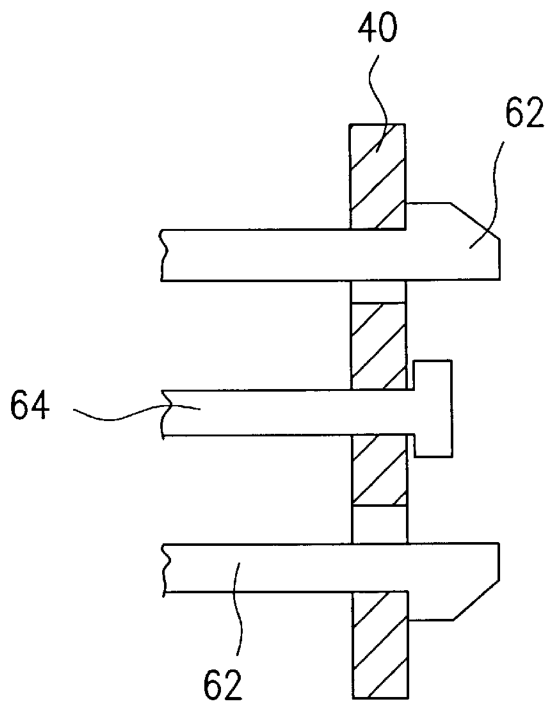
FIGS. 8(*a*) and 8(*b*) are views showing a thermoplastic deformation for strengthening the latching between the pins and pin holes, where FIG. 8(*a*) shows the pins transformed into a thermoplastic condition and FIG. 8(*b*) shows the pins and resilient latching portions transformed into a thermoplastic condition.
Figure 8B:
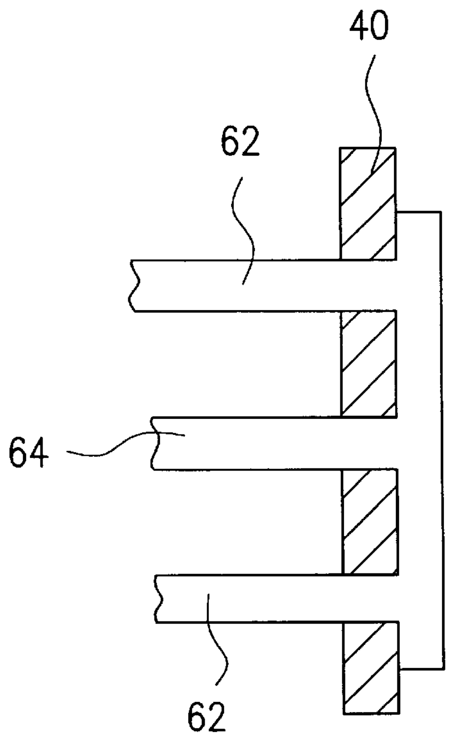

FIG. 8(*a*) is a view showing a case of transforming plastically and thermally the tip of pin 64, making it larger than the pin hole 44, after pin 64 is inserted into the pin hole 44.

Since it is difficult to predict the force which may he applied to the outer cover 60, if only the latching strength between the pin 64 and the pin hole 44 is increased, this may not always be enough to hold cover 60. Therefore, in some cases it is preferred that not only the tip of the pin 64 be transformed thermally and plastically, but that the resilient latching portion 62 is also transformed thermally and plastically. Moreover, as shown FIG. 8(*b*), it is also possible to melt and adhere both the resilient latching portion 62 and the pin 64 together.

A second embodiment in accordance with the present invention will next be explained based on FIGS. 9 and 10. Elements which have the same construction and operation as like elements in the prior embodiment will have the same reference numbers.

As explained above, even if a variation of the stop position of the tray occurs in loading the tray, the closing condition of the tray port is maintained since the outer cover is forced in a direction of the inner cover by the elastic member which is provided in the mechanism attaching the outer cover to the inner cover. In the second embodiment of the invention, the above sealing efficiency can be obtained by providing a member which functions similarly to that of the outer cover.

Figure 9:
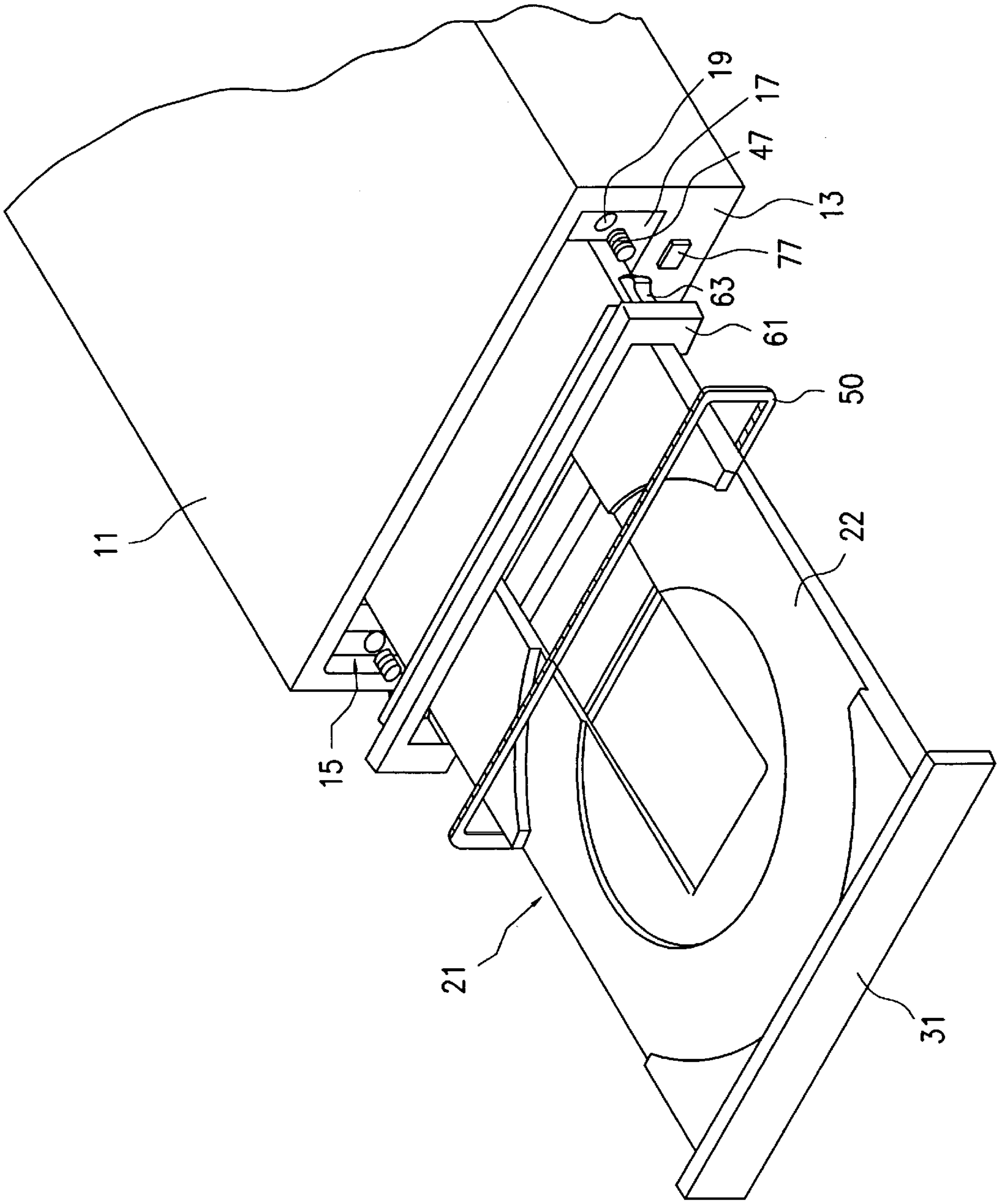
FIG. 9 is an exploded perspective view showing an information recording and reproducing apparatus which is used to explain operation of a second embodiment of the invention.

FIG. 9 is an exploded perspective view of the information recording and reproducing apparatus in accordance with the second embodiment of the invention. It has a housing 11 for an information recording and reproducing apparatus, and a tray 21, for loading or unloading from the tray port 15, provided at the front panel 13 of the housing. The tray port 15 has a portion 17 formed in a step, and a spring hole for storing a spring 47 is provided for both side portions of the step portion 17.

The tray 21 has a disc table 22 for receiving a disc and a cover 31 provided in the front side of the ejecting direction. Both edge portions of the contacting member 61 have resilient latching portions 63, and a tip 63*a* of it is formed in taper and has a hook portion 63*b* (FIG. 10). The contacting member 61 is inserted into the tray port 15 and the spring 47 is stored in the spring hole 19. The tip 63*a* of the resilient latching portion 63 contacts an inner side edge portion of the tray port 15, and transforms the resilient latching portion 63. As a consequence, the hook portion 63*b* hooks the tray port 15 and the contacting member 61 is forced in a loading direction by the spring 47.

Once the hook portion hooks the tray port 15, hooking of the contacting member 61 and the tray port 15 cannot be undone except by transforming the resilient latching portion 63 or destroying it.

With the above structure, when the disc 70 is placed on the disc table 22 and a load/eject switch 77 is pressed, a motor (not shown) acts and loading starts.

Cover 31 of the tray 21 is inserted into the tray 15 and the cover 31 contacts the sealing member 50. After that, the cover 31 presses the contacting member 61 against the force of the spring 47. In reaching the predetermined position, a sensor (not shown) acts and the driving of the motor is stopped.

Figure 10A:
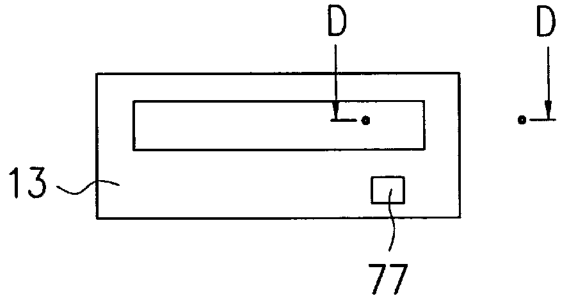
FIGS. 10(*a*), 10(*b*) and 10(*c*) are partial cross-section views showing the contacting relation between the contacting member and the cover in various stop positions of the tray, where FIG. 10(*a*) is a view showing cross-section point in FIG. 10(*b*) or FIG. 10 (*c*), FIG. 10(*b*) shows the tray stopping before a predetermined position and FIG. 10(*c*) shows the tray stopping beyond the predetermined position.
Figure 10B:
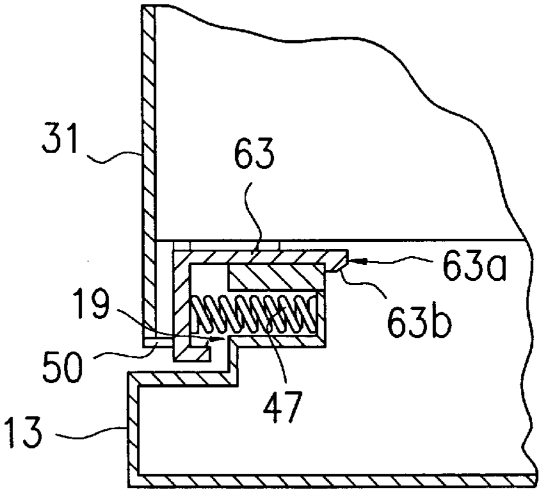
Figure 10C:
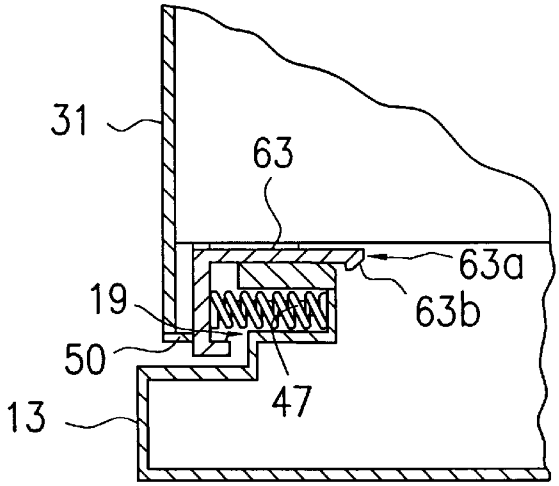

FIG. 10 is a view showing a relation between the cover 31 and the tray 15 when the stop position of the tray is different. FIG. 10(*a*) is a view showing the cross-sectioned areas reported in FIGS. 10(*b*) and 10(*c*). FIG. 10(*b*) shows that the tray 21 stops just before the predetermined position, and FIG. 10(*c*) shows that the tray 21 stops a little past the predetermined position.

At this point, even if the cover 31 contacts the contacting member 61 through the sealing member 50, the contacting member 61 is forced in a forward direction beyond the spring 47, and it is possible to keep the apparatus closed while absorbing variations of the stop position of the tray 21, by virtue of the spring 47.

The sealing member 50 may be fixed to the contacting member 61 by adhesive or other means. But, it is possible to also fix the sealing member 50 to the cover 31.

Also it may be possible under some conditions (for example, where a perfect airtight seal is not required), to omit the sealing member. In that case, the cover 31 contacts the contacting member 61 directly.

The sealing member 50, may be made of rubber, sponge or the like. As noted earlier, cloropene rubber, urethane rubber, silicone rubber or the like are suitable from the viewpoint of endurance or sealing. Further for a sponge, foamed sponge with high airtight property like a foamed polyurethane is suitable.

The sealing member may be attached by an adhesive or a double-sided adhesive tape can be used.

Moreover, instead of a spring 47, other resilient elements made of rubber, sponge or the like can be used.

In the second embodiment, a step portion is provided for the tray port of the housing. But the present invention is not limited to this case, as the step portion is not necessary.

A third embodiment will next be explained. For those parts which have the same function and operation as like parts in the first embodiment and second embodiments the same reference numbers are used.

In each of the first two embodiments, the outer cover is attached to the inner cover and keeps a closing condition by forcing the outer cover to a direction of the inner cover by a elastic member (e.g., a spring).

An information recording and reproducing apparatus in accordance with the third embodiment has a tray elastic member and a cover formed integrally in one body or fixed together.

Figure 11:
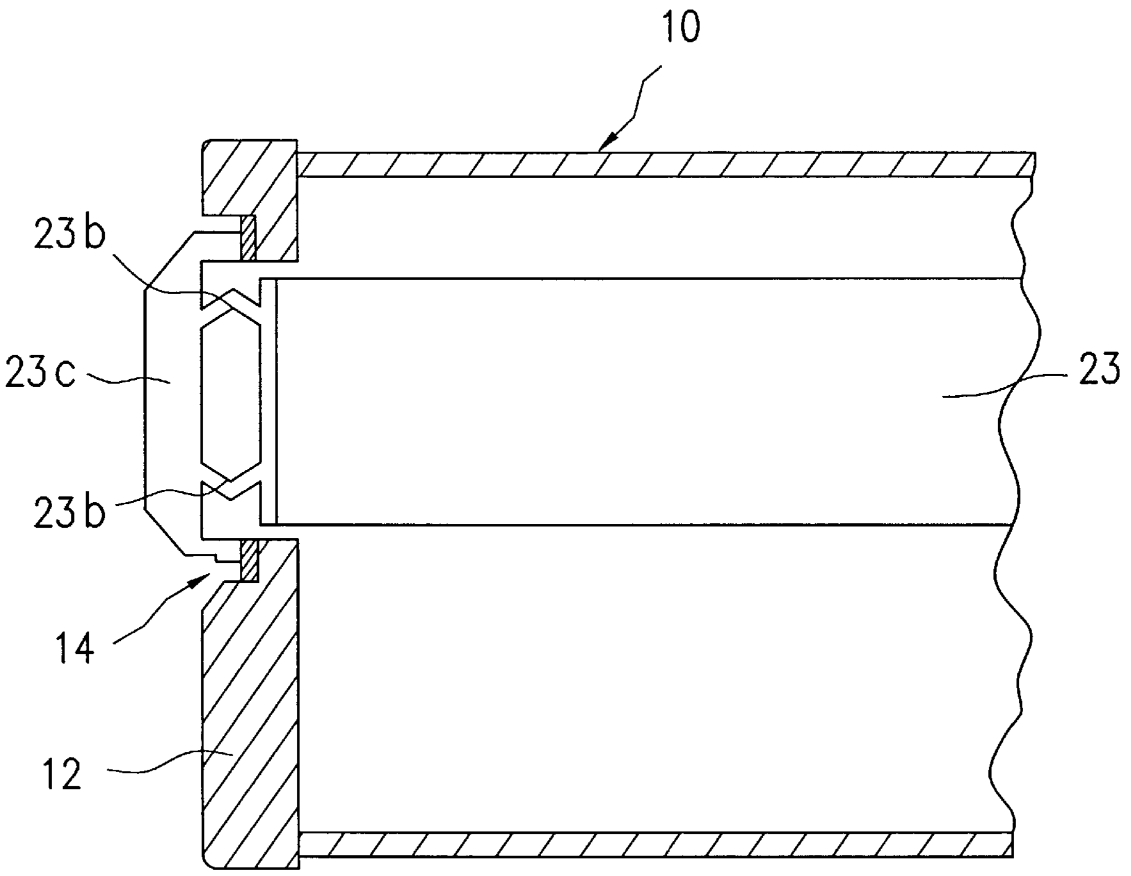
FIG. 11 is an exploded cross-sectional perspective view showing an information recording and reproducing apparatus which is used to explain a third embodiment.
Figure 12:
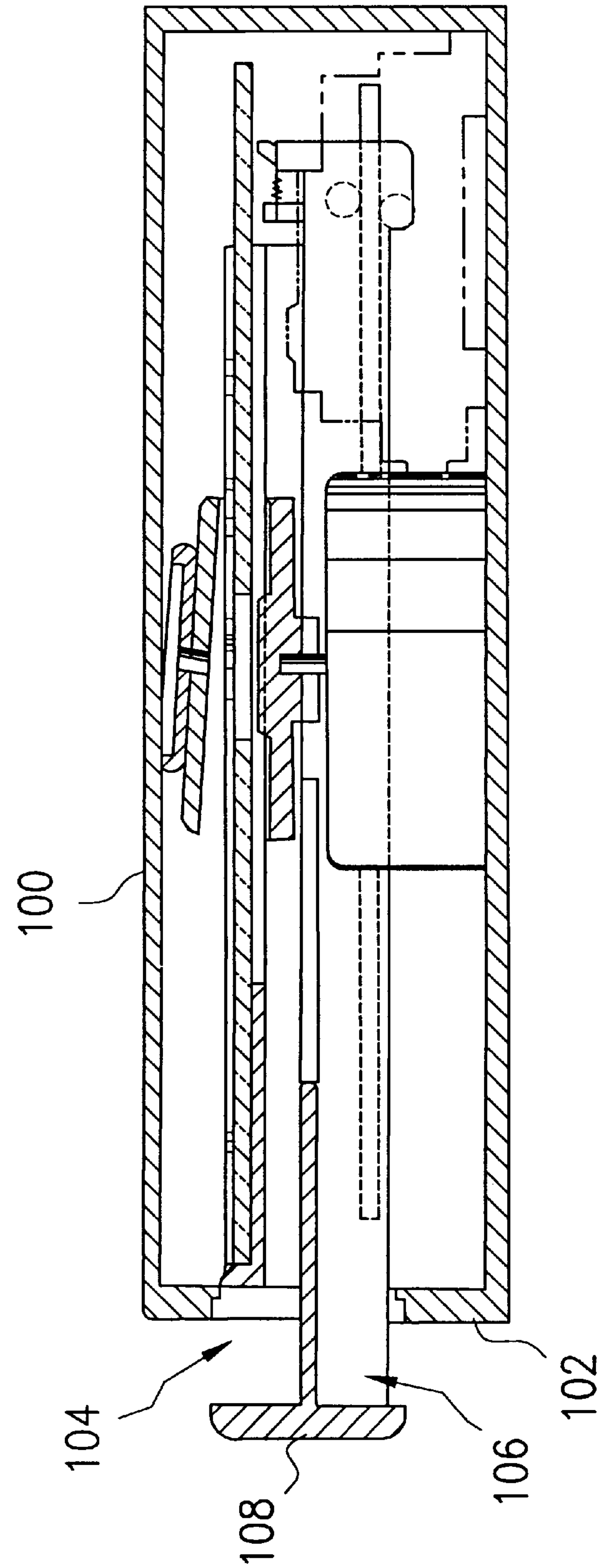
FIG. 12 is a cross-section view showing an information recording and reproducing apparatus which is used to explain the prior art.
Figure 13:
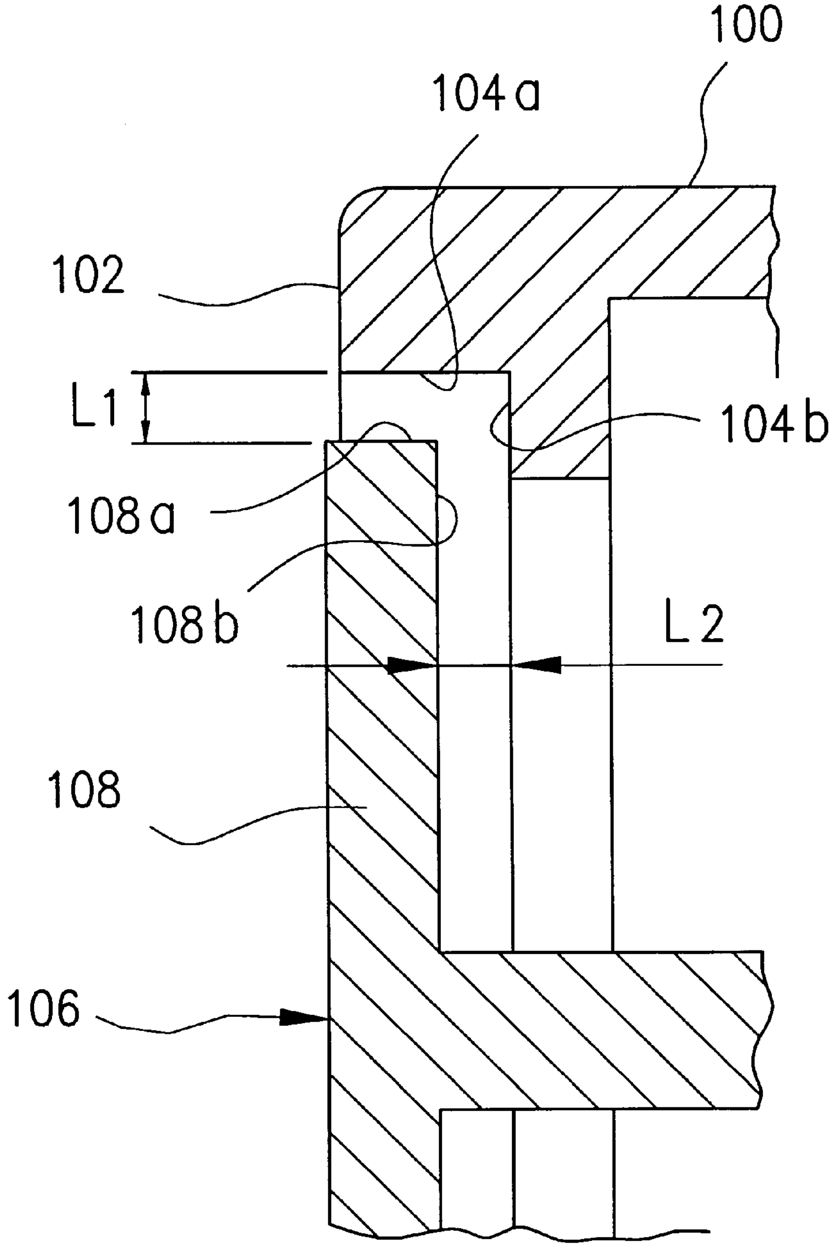
FIG. 13 is a partially enlarged cross-section view showing an information recording and reproducing apparatus which is used to explain the problem solved by the invention.

FIG. 11 is a partial cross-section view showing an essential part of an information recording and reproducing apparatus in accordance with the third embodiment. The tray 23 has a elastic member 23*b* elastically connecting the tray 23 and cover 23*c*. In loading the tray, first of all, the cover 23*c* contacts the tray port 14 and it stops. After that the tray 23 stops. Accordingly, any variation in the relative distance between the cover 23*c* and the tray 23 is absorbed by elastic transformation with flexibility of the elastic member 23*b*. Consequently, contact of the cover 23*c* with the tray port 14 is maintained by the elastic force of the elastic member 23*b*, and the closing condition of the tray port 14 is thus maintained.

In the third embodiment, the elastic member 23*b* and the cover 23*c* are formed as one unit, but it is also possible to affix the two parts to each other.

By forming the elastic member 23*b* with resilient elements like a sponge or rubber, and compressing the elastic member 23*b*, it is possible to provide a dust proof seal for the recording/reproducing apparatus.

As mentioned above, in connection with the first embodiment of the present invention, the tray port is closed by operating the closing means, and after that, the relative distance between the closing means and the tray port when the tray reaches the predetermined position is variable. Such variation of the relative distance between the cover and tray 23 is absorbed by the closing hold means, and the contacting condition between the closing means and the tray port is maintained. Accordingly, in loading the tray, even if a stop position of the tray may be variable, it is possible to close the tray port to prevent dust from entering the interior of the apparatus.

Moreover, because a circumference of the tray port has a portion formed in a step form and the closing means contacts the step portion, the position of the tray in an up and down direction and left and right direction on entering the port can be corrected, and it is possible to prevent the cover from projecting from a front panel. Accordingly, it is possible to prevent a user from carelessly touching the cover.

Still further, since the closing means has an inner and outer cover, even if the inner cover is loaded with the tray and the relative distance between the outer cover and inner cover changes, the forcing means absorbs it and the outer cover is forced to contact with the tray port by the forcing power.

Still further, the outer cover and the inner cover are hooked together by the resilient latching portion, the position of the outer cover against the inner cover can be corrected by a pin. Accordingly, the hooking together of the outer cover and the inner cover is easy, while unhooking of the two is difficult.

Still further, the outer cover corrects motion and inclination in an up and down direction of the outer cover against the inner cover. Accordingly, a user will not mistake motion and inclination of the outer cover to be caused by an accident.

Still further, since the inclination and motion of the pin is corrected, it is possible to restrain the inclination and motion of the pin.

Still further, since the resilient latching portion has a hook at the tip of it, and latches the latching hole, the latching is easy, yet it is difficult to undo it.

Still further, at least a tip of either the resilient latching portion or the pin may be transformed thermally and plastically in order to latch the latching hole or the pin hole, providing an easy and strong latch.

Still further, a size of the pin may be made greater than a size of the pin hole, so it is possible to fit and fix the pin into the pin hole.

Still further, either a notch around the pin hole or a slit for connecting the pin hole with the latching hole may be formed. This allows the pin hole to be smaller than a size of the pin. This causes a tighter grip of the pin by the hole to prevent the pin from coming off.

Still further, a rising portion may be provided around the pin hole for nipping the inserted pin and preventing the pin from coming out.

Still further, the interval of the latching hole may be smaller than the interval of the resilient latching portion, after latching, so that the resilient latching portion and the latching hole contact each other and are latched by adequate tension.

Still further, the sealing member may be provided around the circumference of the outer cover, compared with direct contacting the tray port of the outer cover, so that even if there is a little distortion or curve on the contacting face, it is still possible to close the interior of the apparatus perfectly.

Still further, the sealing member may be provided around the tray port, compared with the outer cover contacting to the step portion directly, so that even if there is a little distortion or curve on the contacting face, it is possible to close the interior of the apparatus perfectly.

Still further, as the forcing power of the forcing member is smaller than the loading power of the tray, even if a stop position of the tray is variable, the forcing member absorbs this variation and the outer cover is forced by the absorbed power. Further, it is possible to close the tray port in the usual manner.

Still further, any one of a spring, sponge or rubber element may be used as a forcing member, making it possible to provided a cheap information recording and reproducing apparatus.

Still further, since a contacting member forced by the forcing member is provided for the tray port, even if stop position of the tray is variable, the forcing member absorbs the variation, and the contacting member and the cover are usually contacted by this contractible power.

Still further, the resilient latching portion may be provided with a hook portion for the contacting member. The hook portion may latch the tray port, making attachment of the contacting member easy.

Still further, when the sealing member is provided around the cover, compared with the cover's contacting the contacting member directly, even if there are a little distortion or curve on the contacting face, it is possible to close the interior of the apparatus perfectly.

Still further, when the sealing member is provided around the contacting member, compared with the cover's contacting the contacting member directly, even if there is a little distortion or curve on the contacting face, it is possible to close the interior of the apparatus perfectly.

Still further, as the cover and the elastic member are fixed or formed in a body, even if a stop position of the tray in loading the tray is variable, it is possible to close the tray port in the usual manner, and to prevent dust from entering the interior of the apparatus.

While preferred embodiments of the invention have been described and illustrated, the invention is not limited by the foregoing description but is only limited by the scope of the appended claims.

What is claimed is:

1. An information recording and reproducing apparatus comprising:

a housing having a tray port;

a tray for ejecting and loading a recording/reproducing medium through said tray port;

a closing structure for closing the tray port by contacting a circumferential area around the tray port, when the tray is loaded;

a closing holder for holding a closing condition of the tray port with a force which presses the closing structure against said circumferential area in a loading direction of the tray by a force which is responsive to a variable relative position between a stopped tray and the closing structure;

wherein:

the closing structure has a cover which closes the tray port, and a contacting member which latches the tray port and contacts the cover, said closing holder being provided between the contacting member and the tray port and having a forcing member for forcing the contacting member in a tray ejecting detection such that when the tray loads and the cover is closed the tray port contacts with the contacting member and the forcing member forces the contacting member in a tray ejecting direction to keep the tray port closed.

2. An information recording and reproducing apparatus as claimed in claim 1, wherein:

the contacting member has a resilient latching portion with a hook portion which latches an inner round wall of the tray port, the latching portion contacting the inner round wall of the tray port when the tray is ejected to correct an eject position of the contacting member, the forcing member producing elastic transformation during tray loading and keeping the contacting member contacting the cover.

3. An information recording and reproducing apparatus as claimed in claim 2, further comprising:

a sealing member which is provided for the cover which contacts the tray port when the tray is loaded.

4. An information recording and reproducing apparatus as claimed in claim 2, further comprising:

a sealing member provided on said contacting member for contacting said cover.

5. An information recording and reproducing apparatus as claimed in claim 1, further comprising:

a sealing member which is provided for the cover which contacts the tray port when the tray is loaded.

6. An information recording and reproducing apparatus as claimed in claim 1, further comprising:

a sealing member provided on said contacting member for contacting said cover.

7. An information recording and reproducing apparatus as claimed in claim 1, wherein:

the closing structure has a cover which closes the tray port, the closing holder has as elastic member which maintains a closing condition with elastic transformation by the loading power when the tray is loaded.

8. An information recording and reproducing apparatus as in claim 7 wherein the elastic member and cover are fixed to the tray.

9. An information recording and reproducing apparatus as in claim 7 wherein the elastic member and cover are integrally formed.

* * * * *